United States Patent
Tsuyuzaki et al.

(10) Patent No.: US 9,493,131 B2
(45) Date of Patent: Nov. 15, 2016

(54) STRUCTURE FOR FRONT OF VEHICLE BODY

(71) Applicant: HONDA MOTOR CO., LTD., Minato-Ku, Tokyo (JP)

(72) Inventors: Takumi Tsuyuzaki, Wako (JP); Yuki Ohkawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/911,375

(22) PCT Filed: Jun. 3, 2014

(86) PCT No.: PCT/JP2014/064722
§ 371 (c)(1),
(2) Date: Feb. 10, 2016

(87) PCT Pub. No.: WO2015/029531
PCT Pub. Date: Mar. 5, 2015

(65) Prior Publication Data
US 2016/0193978 A1    Jul. 7, 2016

(30) Foreign Application Priority Data
Aug. 30, 2013  (JP) ................................ 2013-178859

(51) Int. Cl.
*B60R 19/24*  (2006.01)
*B62D 25/08*  (2006.01)

(52) U.S. Cl.
CPC ............. *B60R 19/24* (2013.01); *B62D 25/082* (2013.01); *B60R 2019/247* (2013.01)

(58) Field of Classification Search
CPC ............... B60R 19/24; B60R 2019/247; B62D 25/085; B62D 25/082

USPC ............. 296/187.09, 193.09, 193.1, 203.02; 293/115, 154
See application file for complete search history.

(56) References Cited

U.S. PATENT DOCUMENTS

| | | | |
|---|---|---|---|
| 2002/0190542 A1* | 12/2002 | Takeuchi | B60R 19/12 296/203.02 |
| 2015/0251613 A1* | 9/2015 | Mori | B60R 19/18 296/187.09 |
| 2015/0266529 A1* | 9/2015 | Criaud | B60Q 1/045 29/897.2 |

FOREIGN PATENT DOCUMENTS

| | | |
|---|---|---|
| JP | 2010-149601 A | 7/2010 |
| JP | 2012-192837 A | 10/2012 |
| JP | 2013-032038 A | 2/2013 |
| JP | 2013-052851 A | 3/2013 |
| WO | 2012/101923 A1 | 8/2012 |

* cited by examiner

*Primary Examiner* — Jason S Morrow
(74) *Attorney, Agent, or Firm* — Carrier Blakcman & Associates, P.C.; Joseph P. Carrier; William D. Blackman

(57) ABSTRACT

A structure for the front of a vehicle body includes left and right front-side frames extending in the longitudinal direction thereof, a front bulkhead provided between the front ends of said left and right front-side frames; and a bumper laid out in front of said front bulkhead. Left and right side bulkhead members include left and right front walls and left and right rear walls located behind said left and right front walls at a distance therefrom. The bumper overlaps the front surfaces of the left and right front walls. Left and right stays extend between the left and right front walls and the left and right rear walls. The front ends of said left and right stays, the left and right front walls, and the bumper are joined together. The rear ends of the left and right stays are joined to the left and right rear walls.

8 Claims, 8 Drawing Sheets

STRUCTURE FOR FRONT OF VEHICLE BODY

TECHNICAL FIELD

The present invention relates to an improvement in a front bulkhead and peripheral parts thereof in a vehicle body front part of a vehicle such as a passenger vehicle.

BACKGROUND ART

Vehicles, such as passenger vehicles, include a front bulkhead provided in a front part of a vehicle body. A bumper is arranged in front of the front bulkhead. One of such vehicle body front part structure is disclosed, for example, in Patent Document 1.

The vehicle body front part structure disclosed in Patent Document 1 includes left and right front side frames located in the front part of the vehicle body and extending in a longitudinal direction of the vehicle body, and a front bulkhead mounted between front ends of the left and right front side frames. The front bulkhead is a frame-like component having a substantially rectangular shape in a front view, and includes a bulkhead lower member extending in a vehicle width direction, left and right bulkhead side members extending upward from opposite ends of the bulkhead lower member, and a bulkhead upper member extending between upper ends of the left and right bulkhead side members.

The left and right bulkhead side members are each formed to have a substantially U-shaped cross section, in a plan view, opened outward in the vehicle width direction. More specifically, the left and right bulkhead side members have, respectively, left and right front walls facing toward the front of the vehicle body, left and right rear walls located rearwardly of the left and right front walls at a distance therefrom, and left and right inner walls connecting the left and right front walls and the left and right rear walls.

However, since the left and right bulkhead side members have such a cross-sectional shape opened outward in the vehicle width direction as described above, there is a limit to the extent to which the rigidity of the left and right bulkhead side members can be increased. In order to reduce vibration of the vehicle body during traveling of the vehicle, it is necessary to increase the rigidities of the front bulkhead and its peripheral parts in the vehicle body front part. If the left and right bulkhead side members are each formed to have a closed cross section to increase the rigidity of the front bulkhead, the weight of the vehicle body would be increased. Thus, there is a room for further improvement in this respect.

PRIOR ART LITERATURE

Patent Literature

Patent Document 1: Japanese Patent Application Laid-Open Publication No. 2013-032038

SUMMARY OF INVENTION

Technical Problems

It is therefore an object of the present invention to provide an improved technique for increasing rigidity of a front part of a vehicle body by increasing rigidities of a front bulkhead and its peripheral parts in the vehicle body, while suppressing an undesirable increase in weight of the vehicle body.

Solutions to Problems

According to one preferred form of the invention, there is provided a vehicle body front part structure including left and right front side frames located in a front part of a vehicle body and extending in a longitudinal direction of the vehicle body, a front bulkhead mounted between front ends of the left and right front side frames, and a bumper arranged in front of the front bulkhead, characterized in that: the front bulkhead includes left and right bulkhead side members extending vertically to constitute left and right side parts of the front bulkhead; the left and right bulkhead side members have, at least, left and right front walls facing toward the front of the vehicle body, and left and right rear walls located rearwardly of the left and right front walls, respectively, at a distance therefrom; the bumper overlaps front surfaces of the left and right front walls; the left and right bulkhead side members are provided with left and right stays extending between the left and right front walls and the left and right rear walls, respectively; front ends of the left and right stays, the left and right front walls, and the bumper are joined together; and rear ends of the left and right stays are joined to the left and right rear walls, respectively.

It is preferable that the bumper is composed of left and right bumper brackets and a bumper beam bridged between the left and right bumper brackets, and that the left and right bumper brackets are joined to the front ends of the left and right stays, respectively, with the left and right front walls interposed therebetween.

Preferably, inner ends in a vehicle width direction of the left and right front walls and inner ends in the vehicle width direction of the left and right rear walls are formed integrally by left and right inner walls, respectively, so that the left and right bulkhead side members have substantially U-shaped cross sections in a plan view opened outward in the vehicle width direction, and preferably, the left and right stays are joined not only to the left and right front walls and the left and right rear walls, but also to the left and right inner walls.

It is preferable that the left and right stays each have a front joint part formed to be joined to a corresponding one of the left and right front walls, a side joint part formed to be joined to a corresponding one of the left and right inner walls, and a corner part formed in a curved shape in a plan view to connect the front joint part and the side joint part.

Preferably, the left and right stays have left and right beads, respectively, extending in the longitudinal direction of the vehicle body.

It is preferable that the bumper is joined to the left and right front walls at least at upper joint sections and lower joint sections, the bumper, the left and right front walls, and the front ends of the left and right stays are joined together at the upper joint sections, and that the left and right rear walls have left and right fixing parts capable of fixing thereto a component other than the vehicle body in vicinities of left and right rear joint sections at which the rear ends of the left and right stays are joined to the left and right rear walls, respectively.

Preferably, the component is a vehicular washer tank.

Advantageous Effects of Invention

In the invention, the left and right bulkhead side members are provided with the left and right stays extending between the left and right front walls and the left and right rear walls located rearwardly of the left and right front walls, respectively, at a distance therefrom, and the left and right stays are joined to the left and right front walls and the left and right rear walls, respectively. It is thereby possible to increase the rigidity of the left and right bulkhead side members, and to suppress distortion of the left and right bulkhead side members caused by an external force. Thus, only by adding the left and right stays, the left and right bulkhead side members can have increased rigidity with such a simple configuration, while suppressing an undesirable increase in weight of the vehicle body.

Further, the bumper arranged to overlap the front surfaces of the left and right front walls, the left and right front walls, and the front ends of the left and right stays are joined together, respectively. Joint sections between the front ends of the left and right stays and the left and right front walls are located at the same positions as those of the joint sections between the bumper and the left and right front walls. The entire rigidity of the left and right bulkhead side members connected by the bumper can therefore be increased. As a result, the rigidities of the entire front bulkhead and its peripheral parts of the vehicle body can be increased, whereby the rigidity of the front part of the vehicle body can also be increased, and distortion thereof caused by an external force can be suppressed, leading to reduction of vibration of the vehicle body during traveling of the vehicle.

In the invention, the bumper is formed of separate parts, the left and right bumper brackets to be joined to the left and right front walls and the bumper beam as an impact cushioning member. The bumper beam is bridged between the left and right bumper brackets. The left and right bumper brackets are joined to the front ends of the left and right stays, respectively, with the left and right front walls interposed therebetween, thereby increasing the rigidity of the left and right bulkhead side members. As a result, the rigidity of the front bulkhead can be increased. Further, only the left and right bumper brackets as relatively small members of the bumper have to be joined to the front ends of the left and right stays, respectively, with the left and right front walls interposed therebetween. Therefore, the joining operation can be easily performed, and the manufacturing cost can thus be reduced. In addition, since the bumper is thus formed of separate parts, the left and right bumper brackets and the bumper beam, the bumper beam can be easily replaced when the bumper beam is broken by an impact.

In the invention, the left and right bulkhead side members are formed to have substantially U-shaped cross sections in the plan view opened outward in the vehicle width direction. The left and right stays are joined not only to the left and right front walls and the left and right rear walls of the left and right bulkhead side members, but also to the left and right inner walls, respectively. In this manner, even though the left and right bulkhead side members are formed to have the substantially U-shaped cross sections, the left and right bulkhead side members are sufficiently reinforced by the left and right stays, whereby the rigidity thereof can be sufficiently secured. As a result, the rigidity of the front part of the vehicle body can be further increased, and distortion thereof caused by an external force can be further suppressed, leading to further reduction of vibration of the vehicle body during traveling of the vehicle.

In the invention, the left and right stays each have the front joint part formed to be joined to the corresponding one of the left and right front walls, the side joint part formed to be joined to the corresponding one of the left and right inner walls, and the corner part formed in the curved shape in the plan view to connect the front joint part and the side joint part. With the corner part having the curved shape in the plan view, the front joint part and the side joint part are thus connected and integrated with each other to thereby complement each other. Further, since the corner part has the curved shape, stress concentration can be suppressed. It is required that the left and right bulkhead side members, particularly, the left and right front walls have high rigidity because the heavy bumper is joined thereto. In this respect, the rigidity of the front joint parts joined to the front walls can be complemented by the side joint parts. Since the rigidity of the left and right stays is thus increased, the left and right stays can reinforce the left and right bulkhead side members more firmly. Thus, the rigidity of the front part of the vehicle body can be further increased, and distortion thereof caused by an external force can be further suppressed, leading to further reduction of vibration of the vehicle body during traveling of the vehicle.

In the invention, the left and right stays have the left and right beads, respectively, extending in the longitudinal direction of the vehicle body. Thereby, thin and long convex parts (reverse side parts of the beads) extending in the longitudinal direction of the vehicle body are formed on the left and right stays. With the convex parts for reinforcement, the left and right stays have increased rigidity. Thus, even when a large force is applied to the left and right stays from the front bulkhead, the applied force can be received by the left and right stays. That is, the entire rigidity of the left and right bulkhead side members can thereby be increased. As a result, it is possible to suppress distortion of the front bulkhead caused by an external force, and further, to reduce vibration of the front bulkhead during traveling of the vehicle.

In the invention, the bumper is joined to the left and right front walls at least at the upper joint sections and the lower joint sections. The bumper, the left and right front walls, and the front ends of the left and right stays are joined together at the upper joint sections. The rear ends of the left and right stays are joined to the left and right rear walls, respectively, at positions rearward of the upper joint sections. It is possible to fix the component other than the vehicle body to the left and right rear walls in the vicinities of the left and right joint sections at which the rear ends of the left and right stays are joined to the left and right rear walls. The component may be heavy. Namely, the rear ends of the left and right stays are joined to the left and right rear walls, more specifically, to the fixing parts for fixing thereto the heavy component, and the front ends of the left and right stays are joined to the left and right front walls and the bumper. As a result, the rigidity of the fixing parts for fixing thereto the heavy component can be increased. Further, distortion of the front bulkhead caused by an external force can be efficiently suppressed, leading to efficient reduction of vibration of the front bulkhead during traveling of the vehicle.

In the invention, the component is the washer tank for storing washer liquid to be injected toward a front windshield, and is relatively heavy. Since it is desirable that the washer tank be arranged near a washer nozzle, the washer tank is fixed to an upper part of the front bulkhead. The part of the front bulkhead to which the washer tank is fixed is reinforced by a corresponding one of the stays, whereby distortion of the front bulkhead can be efficiently suppressed, leading to efficient reduction of vibration of the front bulkhead.

DESCRIPTION OF EMBODIMENTS

A certain preferred embodiment of the present invention will be described in detail below with reference to the accompanying drawings.

Embodiment

In the following will be described a vehicle body front part structure according to the embodiment with reference to the drawings.

Figure 1:
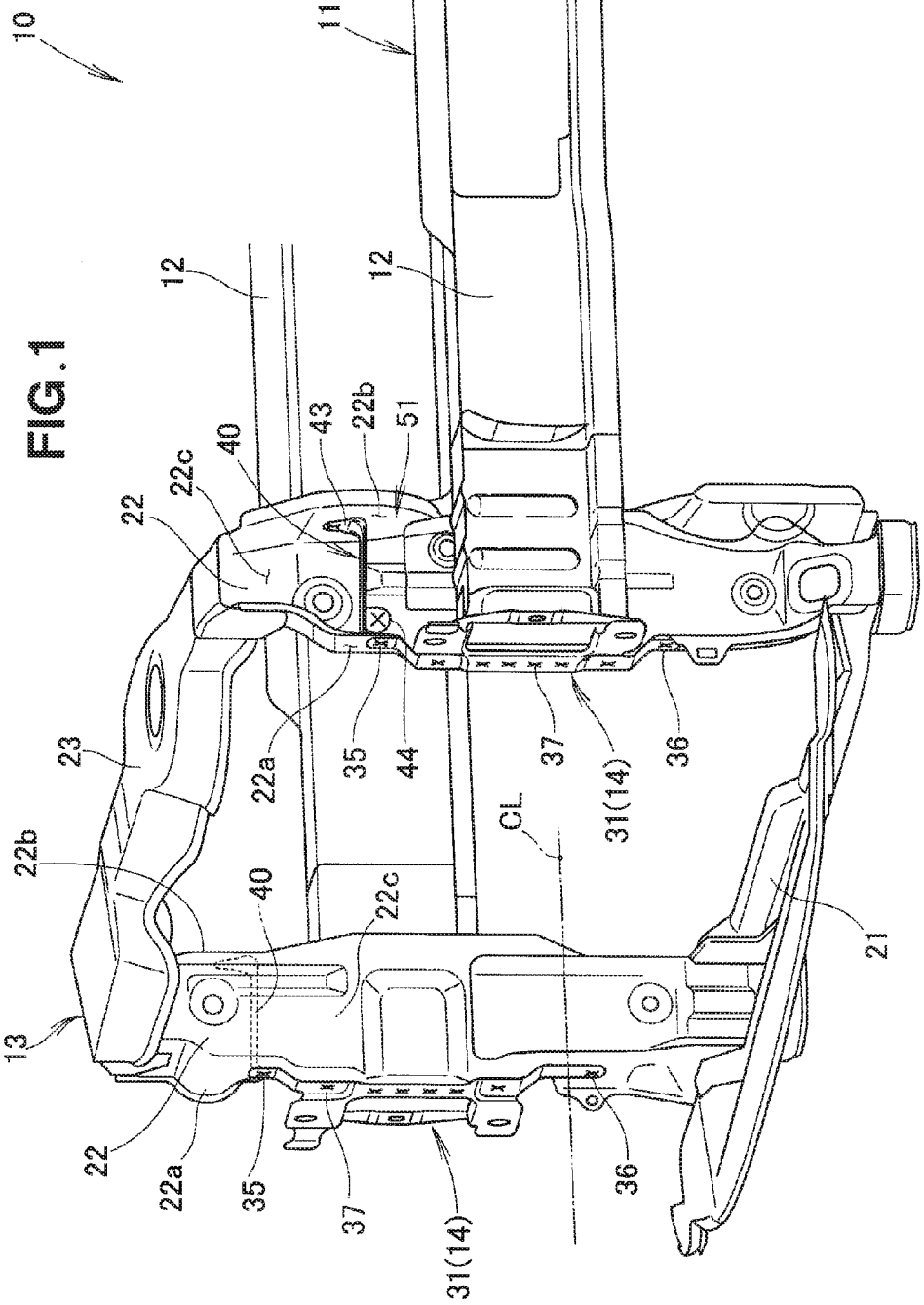
FIG. 1 is a perspective view of a front part of a vehicle body according to the present invention as viewed from left front side.
Figure 2:
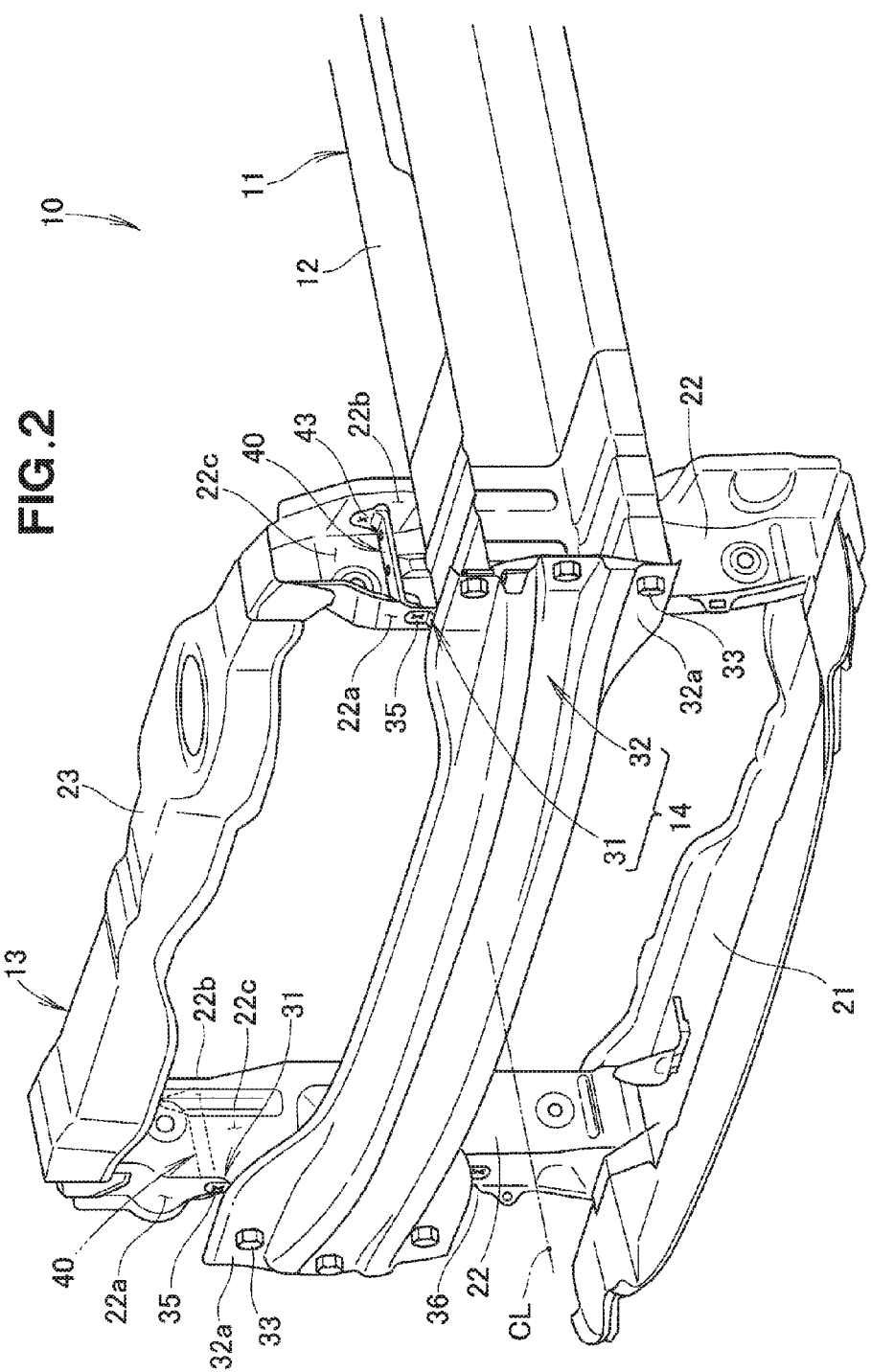
FIG. 2 is a perspective view of the front part of the vehicle body shown in FIG. 1 with a bumper beam being mounted as viewed from left front side.

As shown in FIGS. 1 and 2, a vehicle 10, such as a passenger vehicle, includes a vehicle body 11, which is a monocoque body formed to be substantially bilaterally symmetrical with respect to a centerline CL extending in a front-and-rear or longitudinal direction of the vehicle body and passing through a vehicle width center of the vehicle 10.

The vehicle body 11 includes left and right front-side frames or front side frames 12, 12 located in a front or front part of the vehicle body 11 and extending in the longitudinal direction of the vehicle body, a front bulkhead 13 mounted between front ends of the left and right front side frames 12, 12, and a bumper 14 (FIG. 2) arranged in front of the front bulkhead 13.

The left and right front side frames 12, 12 are each formed to have a substantially U-shaped cross section, in a front view, opened outward in a vehicle width direction, or have a substantially rectangular cross section in the front view.

The front bulkhead 13 is a frame-like component having a substantially rectangular shape in a front view, and includes a bulkhead lower member 21 extending in the vehicle width direction, left and right side bulkhead members or bulkhead side members 22, 22 extending upward from opposite ends of the bulkhead lower member 21, and a bulkhead upper member 23 extending between upper ends of the left and right bulkhead side members 22, 22.

The left and right bulkhead side members 22, 22 thus constitute left and right side parts of the front bulkhead 13. The left and right bulkhead side members 22, 22 are joined at substantially central sections in a height direction thereof to inner surfaces in the vehicle width direction of the front ends of the left and right front side frames 12, 12, respectively.

The left and right bulkhead side members 22, 22 are each formed to have a substantially U-shaped cross section, in a plan view, opened outward in the vehicle width direction. More specifically, the left and right bulkhead side members 22, 22 have left and right front walls 22a, 22a facing toward the front of the vehicle body, left and right rear walls 22b, 22b located rearwardly of the left and right front walls 22a, 22a at a distance therefrom, and left and right inner walls 22c, 22c connecting the left and right front walls 22a, 22a and the left and right rear walls 22b, 22b, respectively. In other words, inner ends in the vehicle width direction of the left and right front walls 22a, 22a and inner ends in the vehicle width direction of the left and right rear walls 22b, 22b are formed integrally with the left and right inner walls 22c, 22c, so that the left and right bulkhead side members 22, 22 have the substantially U-shaped cross sections in the plan view opened outward in the vehicle width direction.

Figure 3:
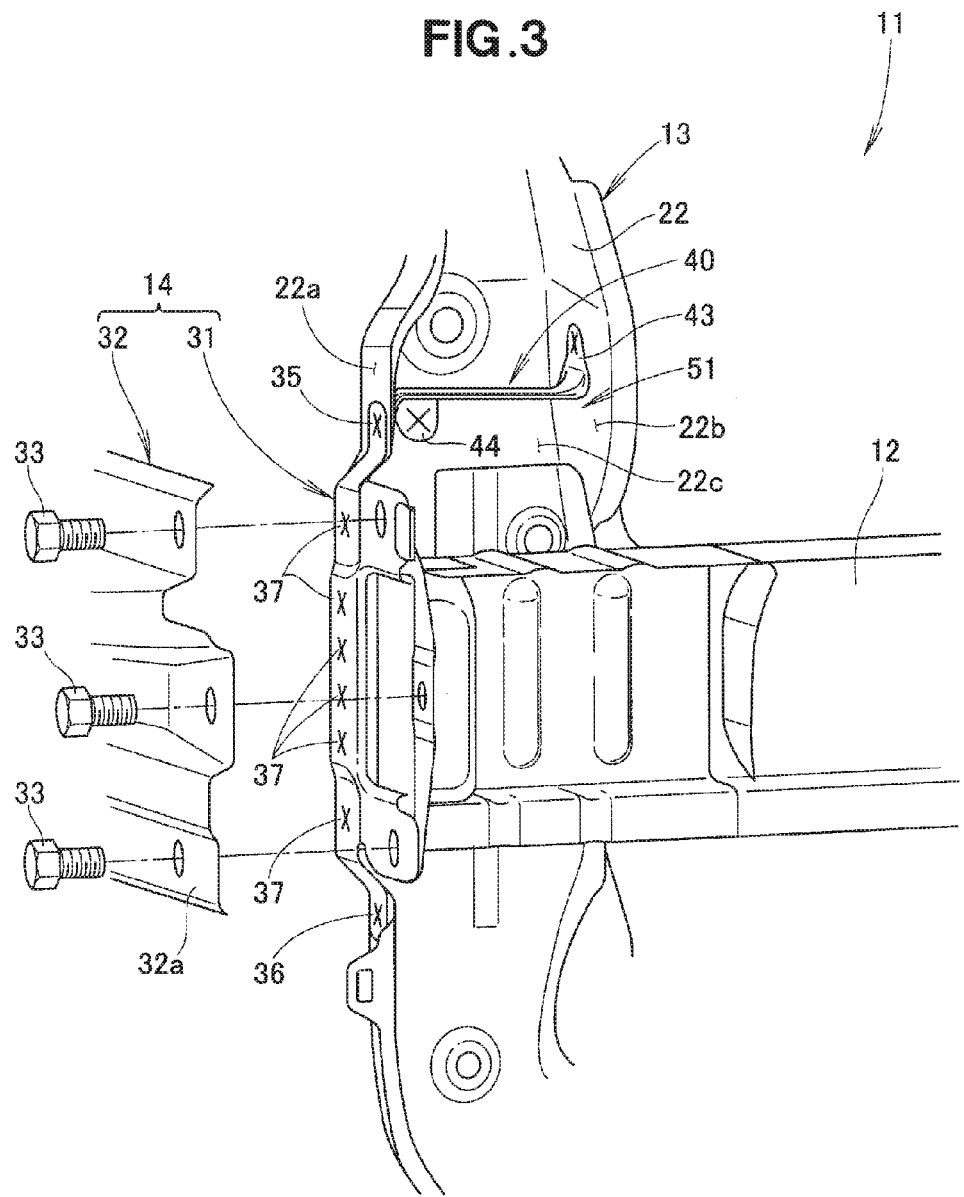
FIG. 3 is an exploded view showing a relationship between a left bulkhead side member and a bumper shown in FIG. 2.

As shown in FIGS. 1 to 3, the bumper 14 is a member overlapping front surfaces of the left and right front walls 22a, 22a, and composed of left and right bumper brackets 31, 31, and a bumper beam 32 bridged between the left and right bumper brackets 31, 31.

More specifically, the left and right bumper brackets 31, 31 are each formed in a substantially vertical plate-like shape with a plate surface facing toward the front of the vehicle, and are joined to front surfaces of the left and right front side frames 12, 12 and the front surfaces of the left and right front walls 22a, 22a. The bumper beam 32 is bridged between the left and right bumper brackets 31, 31. That is, opposite ends 32a, 32a of the bumper beam 32 in the vehicle width direction are arranged to overlap with front surfaces of the left and right bumper brackets 31, 31, respectively, and detachably joined to the left and right bumper brackets 31, 31 via a plurality of bolts 33.

Since the bumper 14 is thus formed of separate parts, the left and right bumper brackets 31, 31 and the bumper beam 32 as an impact cushioning member, the bumper beam 32 can be easily replaced when the bumper beam 32 is broken by an impact.

Figure 4:
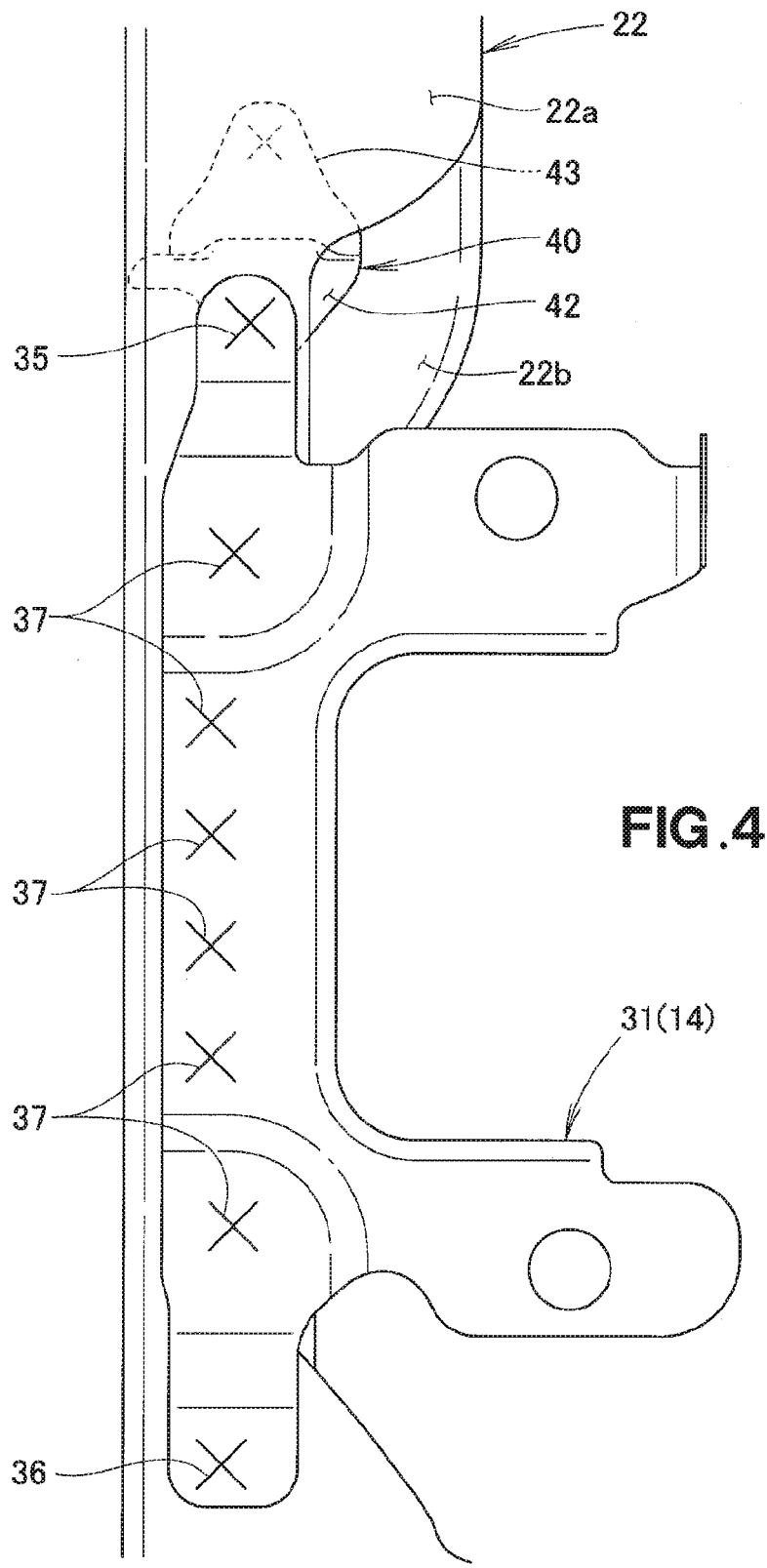
FIG. 4 is a front view of a left bumper bracket joined to a front wall of the left bulkhead side member shown in FIG. 3.

The bumper 14, i.e., the left and right bumper brackets 31, 31 are joined to the left and right front walls 22a, 22a at joint sections including at least upper joint sections 35, 35 and lower joint sections 36, 36, respectively. More specifically, as shown in FIGS. 1, 3, and 4, the joint sections between the left and right bumper brackets 31, 31 and the left and right front walls 22a, 22a are arranged substantially in a vertical line, and all joined by spot welding, for example. The joint sections between the left and right bumper brackets 31, 31 and the left and right front walls 22a, 22a include the upper joint sections 35, 35 located at uppermost parts of the left and right bumper brackets 31, 31, the lower joint sections 36, 36 located at lowermost parts, and pluralities of (for example, six on each side) intermediate joint sections 37, 37 located at intermediate parts.

Figure 5:
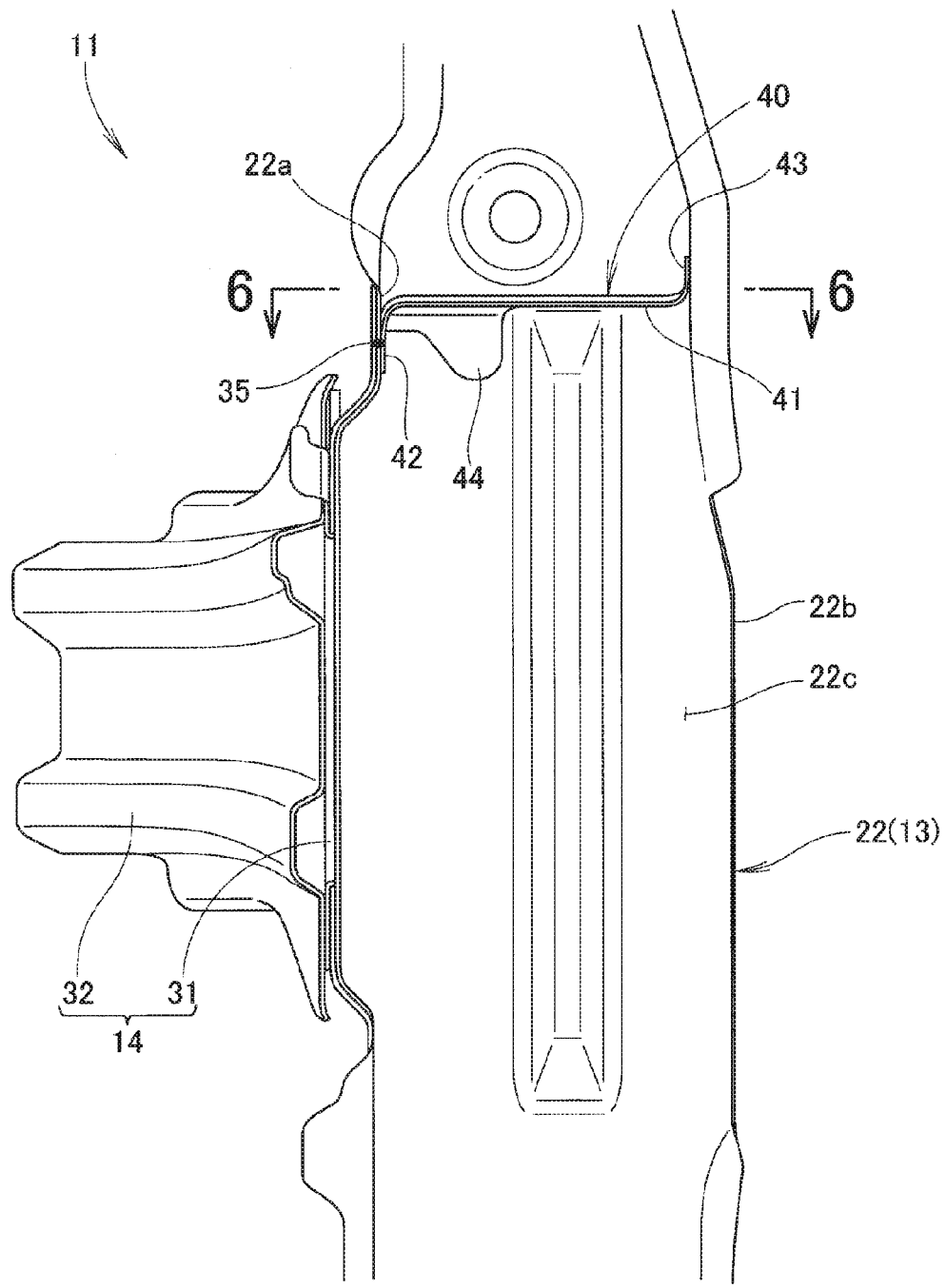
FIG. 5 is a side view showing how the bumper and a left stay are joined to the left bulkhead side member shown in FIG. 2 as viewed from outside in a vehicle width direction.

As shown in FIGS. 1 and 5, the left and right bulkhead side members 22, 22 are provided with left and right stays 40, 40 extending between the left and right front walls 22a, 22a and the left and right rear walls 22b, 22b, respectively. Hereinbelow, the left bulkhead side member 22 and the left stay 40 will be detailed. Note that the right bulkhead side member 22 is bilaterally symmetrical with the left bulkhead side member 22 and has substantially the same configuration, and thus a description thereof is omitted. Further, the right stay 40 is bilaterally symmetrical with the left stay 40 and has substantially the same configuration, and thus a description thereof is omitted.

Figure 7:
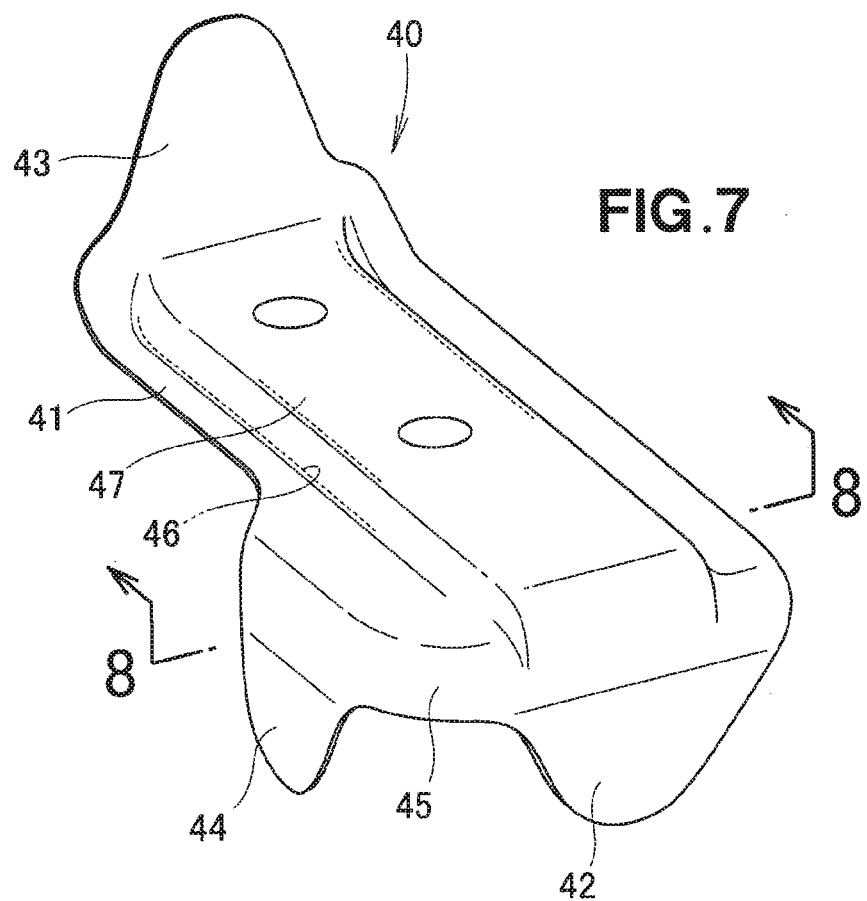
FIG. 7 is a perspective view of the left stay shown in FIG. 5.

The left stay 40 is formed in a thin and long shape extending in the longitudinal direction of the vehicle body, and located upward of the left front side frame 12. As shown in FIGS. 5 and 7, the left stay 40 is formed by bending a sheet metal, for example.

More specifically, the left stay 40 has a stay base part 41 formed in a substantially plate-like shape with plate surfaces facing upward and downward, a front joint part 42 extending upward or downward from a front end of the stay base part 41, a rear joint part 43 extending upward or downward from a rear end of the stay base part 41, a side joint part 44 extending upward or downward from a lateral side end of the stay base part 41, and a corner part 45 extending upward or downward from a corner of the stay base part 41.

For example, the front joint part 42 constitutes a front flange extending downward from the front end of the stay base part 41. The rear joint part 43 constitutes a rear flange extending upward from the rear end of the stay base part 41. The side joint part 44 constitutes a side flange extending in the same direction as the front joint part 42, i.e. downward, from the lateral side end of the stay base part 41. The corner part 45 constitutes a front corner of the stay base part 41 connecting the front joint part 42 and the side joint part 44 and extending in the same direction as the front joint part 42, i.e. downward, from the lateral side end of the stay base part 41. The corner part 45 is formed in a curved shape (arcuate shape) in a plan view.

Hereinbelow, the front joint part 42 is appropriately called the "front flange 42". The rear joint part 43 is appropriately called the "rear flange 43". The side joint part 44 is appropriately called the "side flange 44".

The left stay 40 has a front end (i.e., the front joint part 42) joined to the left front wall 22a. The left stay 40 has a rear end (i.e., the rear joint part 43) joined to the left rear wall 22b. The left stay 40 has a side end (i.e., the side joint part 44) joined to the left inner wall 22c. In this manner, the left stay 40 is joined not only to the left front wall 22a and the left rear wall 22b, but also to the left inner wall 22c.

Figure 8:
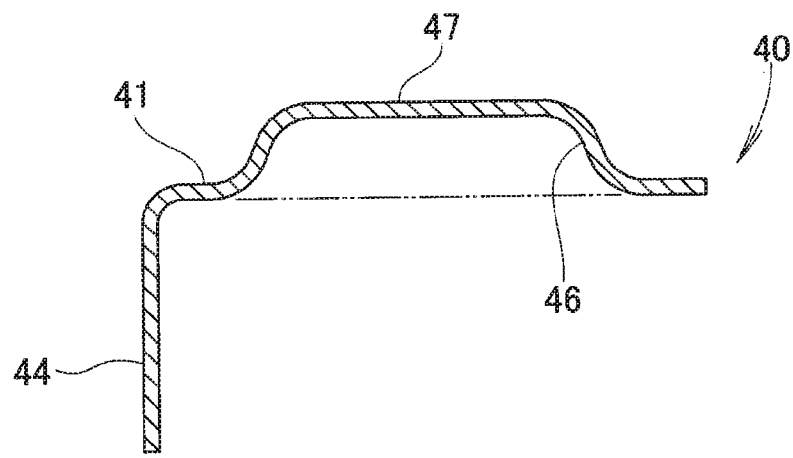
FIG. 8 is a cross-sectional view taken along line 8-8 of FIG. 7.

As shown in FIGS. 7 and 8, the left stay 40 has a left bead 46 extending in the longitudinal direction of the vehicle body. Thereby, a thin and long convex part 47 (or reverse side part 47 of the bead 46) extending in the longitudinal direction of the vehicle body is formed on the left stay 40. With the convex part 47 for reinforcement, the left stay 40 has increased rigidity. Thus, as shown in FIG. 5, even when a large force is applied to the left stay 40 from the front bulkhead 13, the applied force can be received by the left stay 40. That is, the entire rigidity of the left bulkhead side member 22 can thereby be increased. As a result, it is possible to suppress distortion of the front bulkhead 13 caused by an external force, and further, to reduce vibration of the front bulkhead 13 during traveling of the vehicle 10. The right stay 40 has the same function.

As shown in FIGS. 1, and 4 to 6, the front end (front joint part 42) of the left stay 40, the left front wall 22a, and the bumper 14 are joined together. Junction structure of the right stay 40 (FIG. 1) is the same as the left stay 40, and thus a description thereof is omitted.

More specifically, the left bumper bracket 31 of the bumper 14 is joined to the front end of left stay 40 with the left front wall 22a interposed therebetween. The junction structure of the right stay 40 (FIG. 1) is the same as the left stay 40, and thus a description thereof is omitted.

Joint sections at which the bumper 14, the left and right front walls 22a, 22a, and the front ends (front joint parts 42, 42) of the left and right stays 40, 40 are respectively joined together are the abovementioned left and right upper joint sections 35, 35. Namely, the bumper 14, the left and right front walls 22a, 22a, and the front ends of the left and right stays 40, 40 are respectively joined together at the upper joint sections 35, 35. The rear ends (rear joint parts 43, 43) of the left and right stays 40, 40 are joined to the left and right rear walls 22b, 22b, respectively, at positions rearward of the upper joint sections 35, 35.

Summary of the descriptions above is as follows. As shown in FIGS. 1 and 2, the left and right bulkhead side members 22, 22 are provided with the left and right stays 40, 40 extending between the left and right front walls 22a, 22a and the left and right rear walls 22b, 22b, respectively, and the left and right stays 40, 40 are joined to the left and right front walls 22a, 22a and the left and right rear walls 22b, 22b, respectively. It is thereby possible to increase the rigidity of the left and right bulkhead side members 22, 22, and to suppress distortion of the left and right bulkhead side members 22, 22 caused by an external force. Thus, only by adding the left and right stays 40, 40, the left and right bulkhead side members 22, 22 can have increased rigidity with such a simple configuration, while suppressing an undesirable increase in weight of the vehicle body.

Further, the bumper 14 arranged to overlap the front surfaces of the left and right front walls 22a, 22a, the left and right front walls 22a, 22a, and the front ends of the left and right stays 40, 40 are joined together, respectively. Joint sections between the front ends of the left and right stays 40, 40 and the left and right front walls 22a, 22a are located at the same positions as those of the joint sections between the bumper 14 and the left and right front walls 22a, 22a. The entire rigidity of the left and right bulkhead side members 22, 22 connected by the bumper 14 can therefore be increased. As a result, the rigidities of the entire front bulkhead 13 and its peripheral parts of the vehicle body 11 can be increased, whereby the rigidity of the front part of the vehicle body 11 can also be increased, and distortion thereof caused by an external force can be suppressed, leading to reduction of vibration of the vehicle body 11 during traveling of the vehicle 10.

As shown in FIGS. 1 and 3, the left and right bumper brackets 31, 31 are joined to the front ends of the left and right stays 40, 40, respectively, with the left and right front walls 22a, 22a interposed therebetween, and thereby the rigidity of the left and right bulkhead side members 22, 22 can be increased. As a result, the rigidity of the front bulkhead 13 can be increased. Further, only the left and right bumper brackets 31, 31 as relatively small members of the bumper 14 have to be joined to the front ends of the left and right stays 40, 40, respectively, with the left and right front walls 22a, 22a interposed therebetween. Therefore, the joining operation can be easily performed, and the manufacturing cost can thus be reduced.

Figure 6:
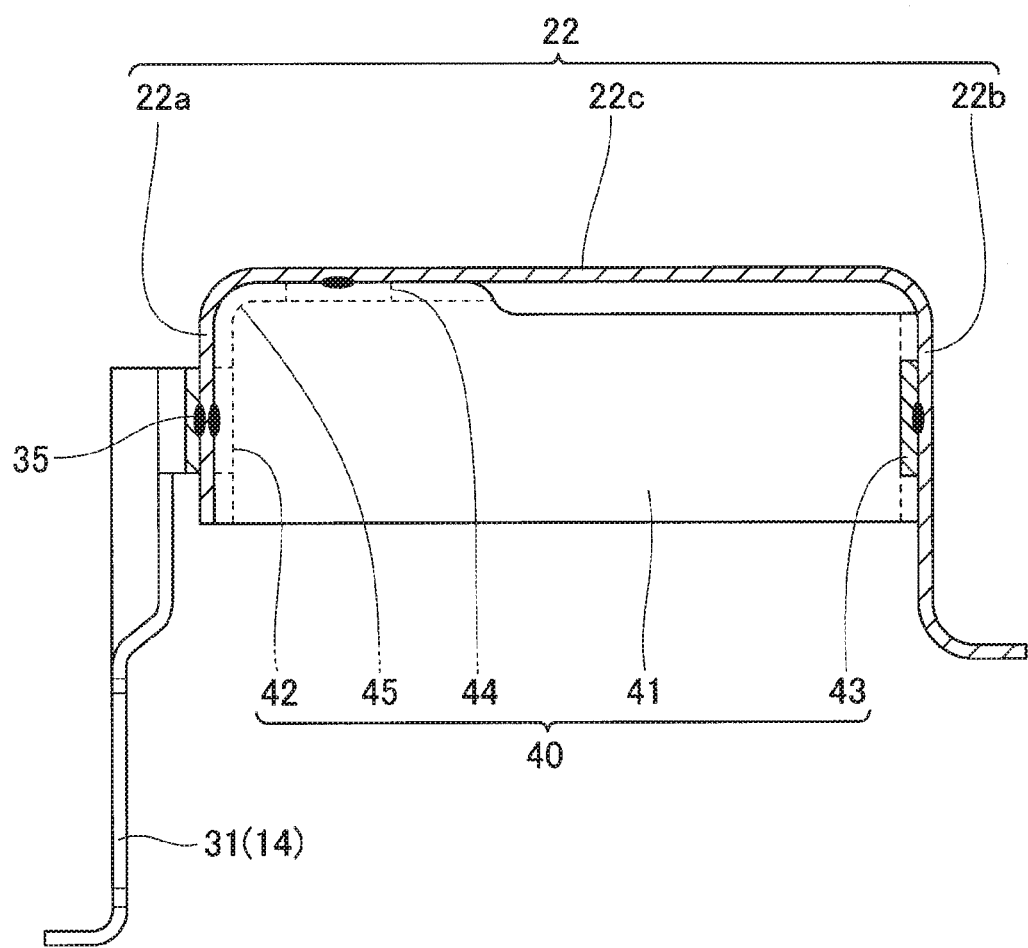
FIG. 6 is a cross-sectional view taken along line 6-6 of FIG. 5.

As shown in FIGS. 1, 5 and 6, the left and right stays 40, 40 are joined not only to the left and right front walls 22a, 22a and the left and right rear walls 22b, 22b of the left and right bulkhead side members 22, 22, but also to the left and right inner walls 22c, 22c, respectively. In this manner, even though the left and right bulkhead side members 22, 22 are formed to have the substantially U-shaped cross sections, the left and right bulkhead side members 22, 22 are sufficiently reinforced by the left and right stays 40, 40, whereby the rigidity thereof can be sufficiently secured. As a result, the rigidity of the front part of the vehicle body 11 can be further increased, and distortion thereof caused by an external force can be further suppressed, leading to further reduction of vibration of the vehicle body 11 during traveling of the vehicle 10.

As shown in FIGS. 6 and 7, the left stay 40 has the front joint part 42 formed to be joined to the left front wall 22a, the side joint part 44 formed to be joined to the left inner wall 22c, and the corner part 45 formed in the curved shape in the plan view to connect the front joint part 42 and the side joint part 44. With the corner part 45 having the curved shape in the plan view, the front joint part 42 and the side joint part 44 are thus connected and integrated with each other to thereby complement each other. Further, since the corner part 45 has the curved shape, stress concentration can be suppressed. The right stay 40 has substantially the same configuration, and thus a description thereof is omitted.

As shown in FIG. 2, it is required that the left and right bulkhead side members 22, 22, particularly, the left and right front walls 22a, 22a have high rigidity because the heavy bumper 14 is joined thereto. In this respect, the rigidity of the front joint parts 42, 42 joined to the front walls 22a, 22a can be complemented by the side joint parts 44, 44. Since the rigidity of the left and right stays 40, 40 is thus increased, the left and right stays 40, 40 can reinforce the left and right bulkhead side members 22, 22 more firmly. Thus, the rigidity of the front part of the vehicle body 11 can be further increased, and distortion thereof caused by an external force can be further suppressed, leading to further reduction of vibration of the vehicle body 11 during traveling of the vehicle 10.

Figure 9:
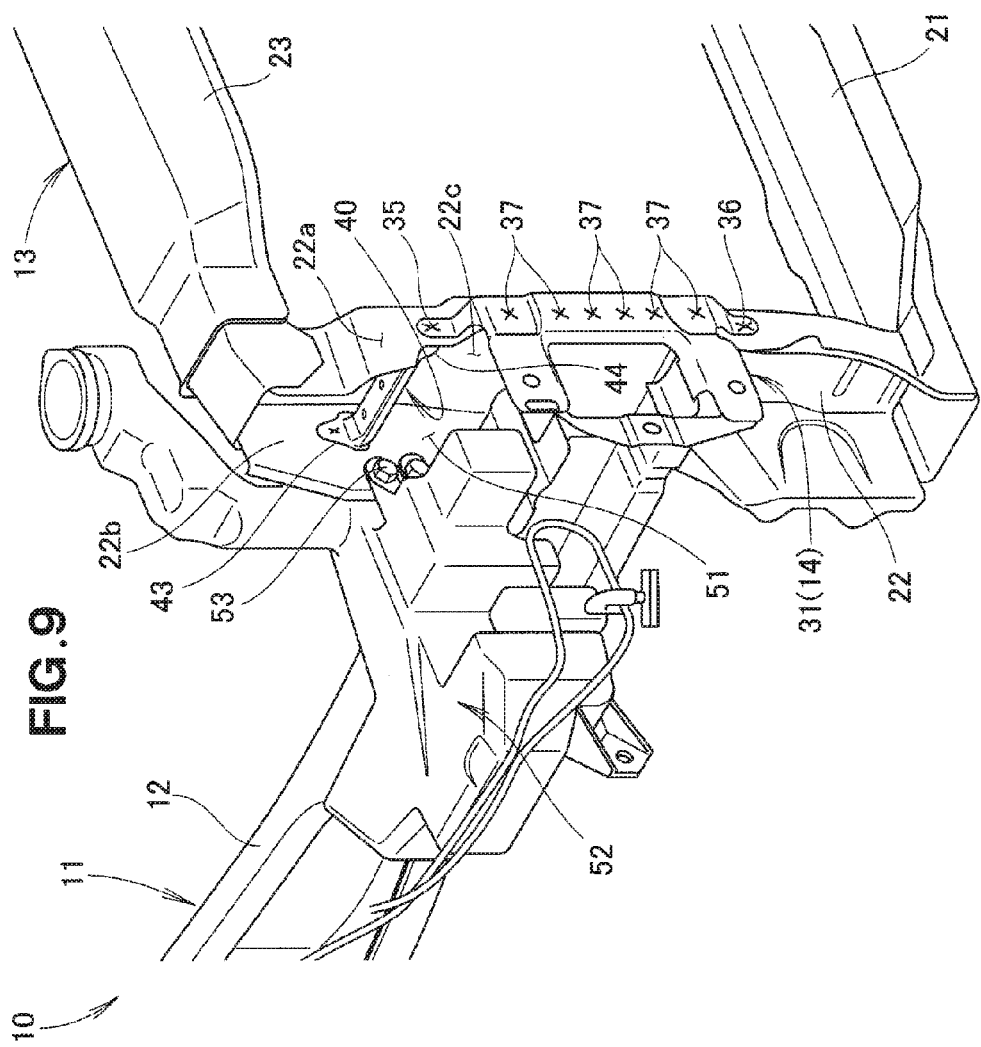
FIG. 9 is a perspective view showing how a washer tank is fixed to a right bulkhead side member shown in FIG. 1 as viewed from right front side.

As shown in FIGS. 3 and 9, the left and right rear walls 22b, 22b have left and right fixing parts 51, 51 capable of fixing thereto a component 52 other than the vehicle body 11 in vicinities of left and right joint sections at which the rear ends (rear joint parts 43, 43) of the left and right stays 40, 40 are joined to the left and right rear walls 22b, 22b, respectively.

As shown in FIG. 9, the component 52 is fixed only to the right fixing part 51, for example. The component 52 may be heavy. Namely, the rear ends of the left and right stays 40, 40 are joined to the left and right rear walls 22b, 22b, more specifically, to the fixing parts 51, 51 for fixing thereto the heavy component 52, and the front ends of the left and right stays 40, 40 are joined to the left and right front walls 22a, 22a and the bumper 14. As a result, the rigidity of the fixing parts 51, 51 for fixing thereto the heavy component 52 can be increased. Further, distortion of the front bulkhead 13 caused by an external force can be efficiently suppressed, leading to efficient reduction of vibration of the front bulkhead 13 during traveling of the vehicle 10.

The component 52 is, for example, a washer tank for storing washer liquid to be injected toward a front windshield (not shown) of the vehicle 10, and is relatively heavy. Hereinbelow, the component 52 other than the vehicle body is appropriately called the "vehicular washer tank 52".

Since it is desirable that the vehicular washer tank 52 be arranged near a washer nozzle (not shown), the vehicular washer tank 52 is fixed to an upper part of the front bulkhead 13 via a bolt 53. The part of the front bulkhead 13 to which the vehicular washer tank 52 is fixed is reinforced by the stay 40, whereby distortion of the front bulkhead 13 can be efficiently suppressed, leading to efficient reduction of vibration of the front bulkhead 13.

INDUSTRIAL APPLICABILITY

The structure for the vehicle body front part of the present invention is well suited for use in vehicles such as passenger vehicles in which a vehicular washer tank is fixed to a front bulkhead mounted on a vehicle body.

REFERENCE SIGNS LIST

10 . . . vehicle, 11 . . . vehicle body, 12 . . . front side frame, 13 . . . front bulkhead, 14 . . . bumper, 22 . . . bulkhead side member (side part of the front bulkhead), 22a . . . front wall, 22b . . . rear wall, 22c . . . inner wall, 31 . . . bumper bracket, 32 . . . bumper beam, 35 . . . upper joint section, 36 . . . lower joint section, 40 . . . stay, 42 . . . front end of the stay (front joint part), 43 . . . rear end of the stay (rear joint part), 44 . . . side joint part, 45 . . . corner part 45, 46 . . . bead, 47 . . . convex part, 51 . . . fixing part, 52 . . . component other than the vehicle body (vehicular washer tank)

The invention claimed is:

1. A vehicle body front part structure including left and right front side frames located in a front part of a vehicle body and extending in a longitudinal direction of the vehicle body, a front bulkhead mounted between front ends of the left and right front side frames, and a bumper arranged in front of the front bulkhead, characterized in that:
   the front bulkhead includes left and right bulkhead side members extending vertically to constitute left and right side parts of the front bulkhead;
   the left and right bulkhead side members have, at least, left and right front walls facing toward the front of the vehicle body, and left and right rear walls located rearwardly of the left and right front walls, respectively, at a distance therefrom;
   the bumper overlaps front surfaces of the left and right front walls;
   the left and right bulkhead side members are provided with left and right stays extending between the left and right front walls and the left and right rear walls, respectively;
   front ends of the left and right stays, the left and right front walls, and the bumper are joined together; and
   rear ends of the left and right stays are joined to the left and right rear walls, respectively.

2. The vehicle body front part structure of claim 1, wherein the bumper is composed of left and right bumper brackets and a bumper beam bridged between the left and right bumper brackets, and wherein the left and right bumper brackets are joined to the front ends of the left and right stays, respectively, with the left and right front walls interposed therebetween.

3. The vehicle body front part structure of claim 1, wherein inner ends in a vehicle width direction of the left and right front walls and inner ends in the vehicle width direction of the left and right rear walls are formed integrally with left and right inner walls, respectively, so that the left and right bulkhead side members have substantially U-shaped cross sections in a plan view opened outward in the vehicle width direction, and wherein the left and right stays are joined not only to the left and right front walls and the left and right rear walls, but also to the left and right inner walls.

4. The vehicle body front part structure of claim 3, wherein the left and right stays each have a front joint part formed to be joined to a corresponding one of the left and right front walls, a side joint part formed to be joined to a corresponding one of the left and right inner walls, and a corner part formed in a curved shape in a plan view to connect the front joint part and the side joint part.

5. The vehicle body front part structure of claim 1, wherein the left and right stays have left and right beads, respectively, extending in the longitudinal direction of the vehicle body.

6. The vehicle body front part structure of claim 1, wherein the bumper is joined to the left and right front walls at least at upper joint sections and lower joint sections, wherein the bumper, the left and right front walls, and the front ends of the left and right stays are joined together at the upper joint sections, and wherein the left and right rear walls have left and right fixing parts capable of fixing thereto a component other than the vehicle body in vicinities of left and right rear joint sections at which the rear ends of the left and right stays are joined to the left and right rear walls, respectively.

7. The vehicle body front part structure of claim 6, wherein the component is a vehicular washer tank.

8. The vehicle body front part structure of claim 2, wherein inner ends in a vehicle width direction of the left and right front walls and inner ends in the vehicle width direction of the left and right rear walls are formed integrally with left and left and right inner walls, respectively, so that the left and right bulkhead side members have substantially U-shaped cross sections in a plan view opened outward in the vehicle width direction, and wherein the left and right stays are joined not only to the left and right front walls and the left and right rear walls, but also to the left and right inner walls.

* * * * *